United States Patent
Kwon

(10) Patent No.: US 8,161,400 B2
(45) Date of Patent: Apr. 17, 2012

(54) APPARATUS AND METHOD FOR PROCESSING DATA OF MOBILE TERMINAL

(75) Inventor: Seo-Young Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 11/425,359

(22) Filed: Jun. 20, 2006

(65) Prior Publication Data

US 2007/0036346 A1 Feb. 15, 2007

(30) Foreign Application Priority Data

Jun. 20, 2005 (KR) .................. 10-2005-0053208

(51) Int. Cl.
*G06F 3/048* (2006.01)
*G06F 3/14* (2006.01)

(52) U.S. Cl. .................. 715/769; 715/810; 715/864

(58) Field of Classification Search .......... 715/769, 715/702, 810, 825, 828, 864
See application file for complete search history.

(56) References Cited

U.S. PATENT DOCUMENTS

| | | | | |
|---|---|---|---|---|
| 5,572,648 A * | 11/1996 | Bibayan | ................. | 715/825 |
| 6,333,973 B1 * | 12/2001 | Smith et al. | ................. | 379/88.12 |
| 6,433,800 B1 | 8/2002 | Holtz | | |
| 6,493,743 B2 * | 12/2002 | Suzuki | ................. | 709/203 |
| 2002/0057292 A1 | 5/2002 | Holtz | | |
| 2002/0062321 A1 * | 5/2002 | Shibata | ................. | 707/200 |
| 2004/0088656 A1 * | 5/2004 | Washio | ................. | 715/526 |
| 2004/0207722 A1 * | 10/2004 | Koyama et al. | ............ | 348/14.02 |
| 2005/0102635 A1 | 5/2005 | Jiang et al. | | |
| 2005/0153746 A1 * | 7/2005 | Yoon | ................. | 455/566 |
| 2005/0289476 A1 * | 12/2005 | Tokkonen | ................. | 715/769 |
| 2006/0053384 A1 * | 3/2006 | La Fetra et al. | ............ | 715/765 |
| 2006/0129945 A1 * | 6/2006 | Dettinger et al. | ............ | 715/769 |
| 2006/0173803 A1 * | 8/2006 | Morris | ................. | 707/1 |
| 2008/0070647 A1 * | 3/2008 | Hamamura et al. | ....... | 455/575.3 |

FOREIGN PATENT DOCUMENTS

| | | |
|---|---|---|
| JP | 4054630 | 2/1992 |
| JP | 11316821 | 11/1999 |
| JP | 2002157198 | 5/2002 |
| JP | 2003241879 | 8/2003 |
| KR | 1020060007705 A | 7/2004 |
| KR | 10-2007-0036114 | 4/2007 |
| WO | 98/48554 | 10/1998 |
| WO | 2006/117105 | 11/2006 |

* cited by examiner

*Primary Examiner* — Simon Ke
*Assistant Examiner* — Rashawn Tillery
(74) *Attorney, Agent, or Firm* — Lee, Hong, Degerman, Kang & Waimey

(57) ABSTRACT

An apparatus and method for processing data of a mobile terminal are disclosed to easily and quickly process data stored in a mobile terminal. When particular data is associated with a particular menu linked to a program for processing the particular data by a user, the program linked to the particular menu is automatically executed to automatically process the particular data.

17 Claims, 6 Drawing Sheets

APPARATUS AND METHOD FOR
PROCESSING DATA OF MOBILE TERMINAL

CROSS-REFERENCE TO RELATED
APPLICATIONS

Pursuant to 35 U.S.C. §119(a), this application claims the benefit of earlier filing date and right of priority to Korean Application No. 10-2005-0053208, filed on Jun. 20, 2005, the contents of which is hereby incorporated by reference herein in its entirety.

BACKGROUND OF THE INVENTION

1. Field of the Invention

The present invention relates to a mobile terminal and, more particularly, to an apparatus and method for processing data of a mobile terminal.

2. Description of the Related Art

In order to display various image data or set data as a background image, related art mobile terminals such as a PDA and a mobile phone must execute a software program (or application) linked to a corresponding menu and fetch image data to execute a corresponding operation.

In addition, generally, a mobile terminal having a touch pad executes a pertinent application through the touch pad and then processes corresponding data through the application. For example, in order to set particular image data as a background image (wallpaper), a user should execute an image program, fetch desired image data through the image program, and then set the fetched image data as a background image.

In case of a related art mobile terminal having a touch screen, in order to process a plurality of data as well as the image data, the related art mobile terminal having the touch screen must execute a pertinent program for processing corresponding data, fetch corresponding data through the executed program, and then process the fetched data.

As stated above, the data processing methods of the related art mobile terminals have the problem that because the particular program such as the image program is executed according to a user request and particular data is fetched through the particular program and processed, a user should select keys of a key screen or the touch screen several times to process the particular data, causing user inconvenience.

BRIEF DESCRIPTION OF THE INVENTION

One aspect of the present invention is the recognition by the present inventors of the related art problems as described above. Based upon such recognition, the present invention has been developed to solve such related ar problems.

One exemplary feature of the present invention is to provide an apparatus and method for processing data of a mobile terminal whereby when particular data desired by a user is associated with a particular menu linked to a software program (or application) for processing the particular data, the software program linked to the particular menu is automatically executed to automatically process the particular data, thereby easily and quickly processing the data stored in a mobile terminal.

To implement at least the above feature in whole or in parts, the present invention provides a mobile terminal comprising: a storage unit for storing a list including at least one data and an application for executing the data; a display unit for displaying the list and at least one menu for representing the application; and a controller for selecting one of more of data displayed on the display unit and linking it to at least one of menus to execute the data.

To implement at least the above feature in whole or in parts, the present invention also provides a method for processing data of a mobile terminal comprising: displaying a list including at least one data and at least one menu representing an application for executing the data on a display unit; associating one or more of data with at least one of menus according to a user inputting; and executing an application corresponding to the menu and processing the selected data as the data is associated with the menu.

To implement at least the above feature in whole or in parts, the present invention also provides an apparatus for processing data of a mobile terminal, in which particular data is dragged by a user through (via) a touch screen or a touch pad of a mobile terminal and dropped to a particular menu linked to a program for processing the particular data, the program linked to the particular menu is automatically executed and then the particular data is automatically processed through the program.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The apparatus and method for processing data of a mobile terminal, whereby when particular data desired by a user is associated with a particular menu linked to a software program (or application) for processing the particular data, the program linked to the particular menu is automatically executed to automatically process the particular data, thereby easily and quickly processing the data stored in a mobile terminal, according to the exemplary embodiments of the present invention will be described with reference to FIGS. 1 to 5.

In the apparatus for processing data of a mobile terminal according to an exemplary embodiment of the present invention, when particular data is dragged by a user through (via) a touch screen of the mobile terminal and dropped to a particular menu icon linked to a program for processing the particular data, the program linked to the particular menu is automatically executed and the particular data is automatically processed through the program. Namely, in the apparatus for processing data of the mobile terminal, when the particular data is associated with the particular menu icon by the user, the program linked to the particular menu icon is automatically executed. Herein, the apparatus for processing data of the mobile terminal can be implemented through a plurality of methods and constructions by a person with an ordinary skill in the art based on the gist of the present invention.

Figure 1:
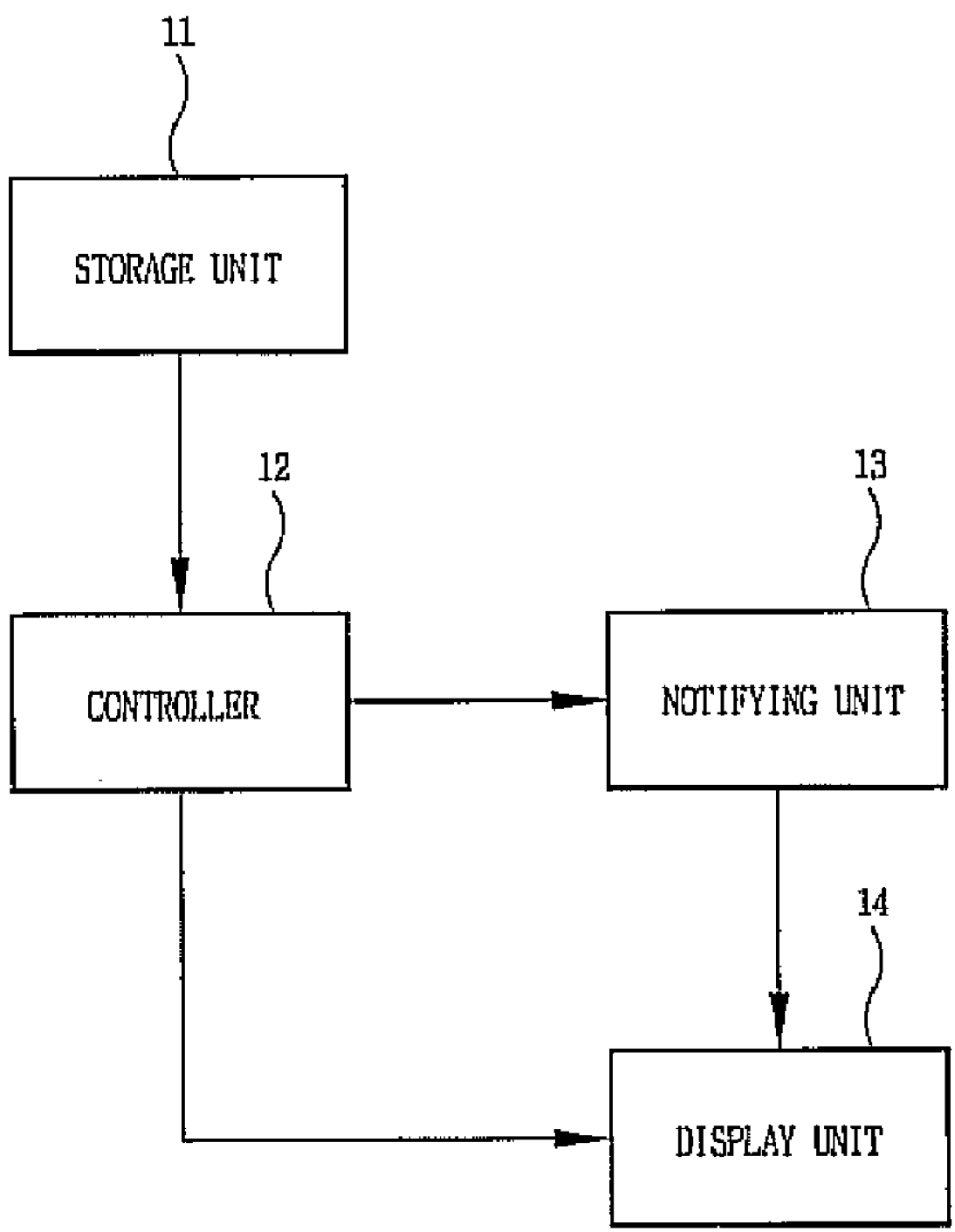
FIG. 1 is a schematic block diagram showing an apparatus for processing data of a mobile terminal according to an exemplary embodiment of the present invention.

FIG. 1 is a schematic block diagram showing an apparatus for processing data of a mobile terminal according to an exemplary embodiment of the present invention.

As shown in FIG. 1, the apparatus for processing data of a mobile terminal may include: a storage unit 11 (e.g., memory or storage device) for storing a plurality of data items (e.g., lists, text objects, text items, directories, databases, etc.) and a plurality of applications (e.g., software programs, codes and the like that are executable by a microprocessor, etc.); a controller 12 (e.g., a microprocessor, etc.) for outputting data included in a particular list selected by a user among the plurality of stored lists and one or more menus with icons (or other types of graphical objects) linked to each of the plurality of applications, and automatically executing an application linked to a particular menu (or menu icon) when particular data among the data is dragged through (or otherwise moved on the screen via) a touch screen (or other touch sensitive device) and then dropped onto the particular menu or icon; a display unit 14 (e.g., an LCD screen, etc.) for displaying data included in the particular list and menus (icons) linked to the plurality of applications under the control of the controller 12; and a notifying unit 13 (e.g., a pop-up window or other type of visual, audible, and/or tactile output) for notifying that the application linked to the particular menu icons has been completely executed under the control of the controller 12.

Herein, the controller 12 automatically executes the application (i.e., a software program) linked to the particular menu icon and then automatically processes the particular data through the application. In addition, the particular data can be dragged through (moved via) a touch pad, as well as through the touch screen, and then dropped to the particular menu. Here, the concept of drag-and-drop in the field of image processing and graphics can be understood by those skilled in the art, and various types of drag-and-drop or other similar user interface techniques can be employed in the present invention.

The apparatus for processing data of the mobile terminal according to the exemplary embodiment of the present invention will now be described in detail with reference to FIG. 1.

First, when a particular list is selected from the plurality of lists stored in the storage unit 11 by a user, the controller 12 outputs data included in the particular list and menus (icons) linked with the plurality of applications on the display unit 14.

The display unit 14 displays the data included in the particular list and the menus (icons) linked to the plurality of applications on its screen. Here, the data and the menu icons may be provided together on the display unit 14. For example, the menu or icons may be shown along an edge of the screen, while the data is shown on the remaining portion of the screen.

When the user selects and moves the particular data among the data displayed on the display unit 14 to a particular menu icon through contact and movement on the touch screen (i.e., the user performs a drag-and-drop operation), the controller 12 executes at least one application linked to the particular menu icon. The particular data is processed according to an operation of the application linked to the particular menu icon. For example, if an application linked to the particular menu icon is an image processing program and the particular data is image data, when the user drags the image data and drops it to the menu icon linked to the image program through the touch screen, the controller 12 automatically executes the image processing program linked to the menu icon and automatically displays the image data via the image processing program. Accordingly, the user can easily and quickly look at the desired image data by simply dragging the image data and dropping it to the menu icon linked to the image program.

Thereafter, when the operation of the application is completed, the controller 12 may output a control signal informing that the operation of the application has been completed to the notifying unit 13.

Then, the notifying unit 13 may provide a visual, audible, and/or tactile output (e.g., outputs a notification message on the display unit 14) informing the user that the operation of the application has been completed based on the control signal from the controller 12.

The display unit 14 may display the notification message through a pop-up window on the screen.

The storage unit 11 can store a plurality of lists (i.e., text objects or text items) such as an image list including image data, a video list including video data, a music list including music data and a phone number list including phone numbers. Here, the file name itself of the stored data or another label created by the user can be used as each list entry. In addition, the storage unit 11 can store a plurality of software applications such as a program (e.g., a program for setting image data as a background photo) for processing image data, an image program for displaying or editing image data; a video reproducing program for reproducing video data, and a management program for managing phone numbers. Other types of data items may be provided in a list format (or other format allowing user selection) and a corresponding software application (or program) for that type of data item or list entry can also be provided.

An exemplary method for easily and quickly processing the plurality of lists and the data included in the plurality of lists through the plurality of applications will be described in detail with reference to FIGS. 2 and 3A to 3D.

Figure 2:
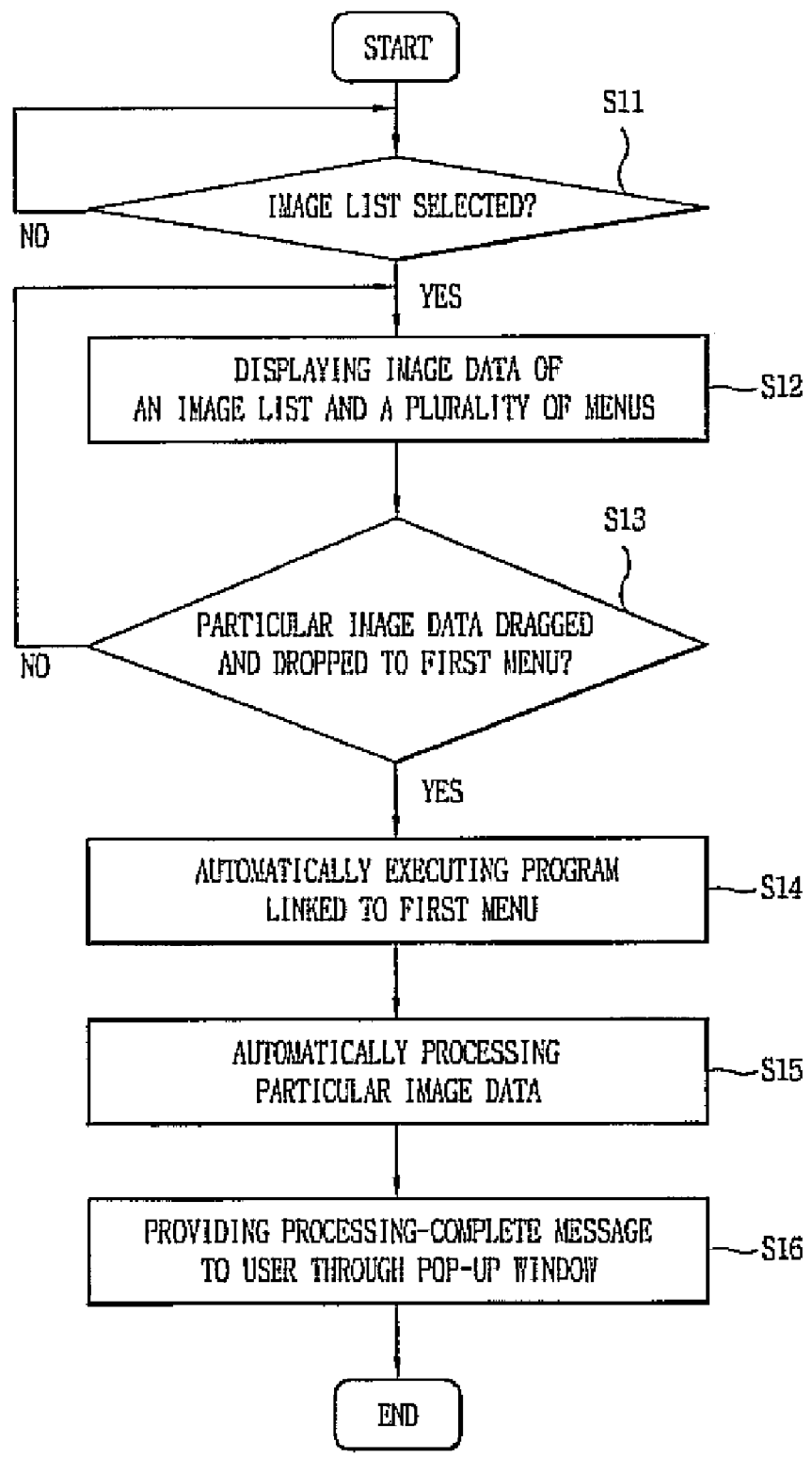
FIG. 2 is a flow chart illustrating the processes of a method for processing image data through the data processing apparatus of the mobile terminal according to the exemplary embodiment of the present invention.

FIG. 2 is a flow chart illustrating the processes of a method for processing image data through the data processing apparatus of the mobile terminal according to the exemplary embodiment of the present invention, and FIGS. 3A to 3D are shows the sequential image data processing through the data processing apparatus of the mobile terminal according to the exemplary embodiment of the present invention.

Figure 3A:
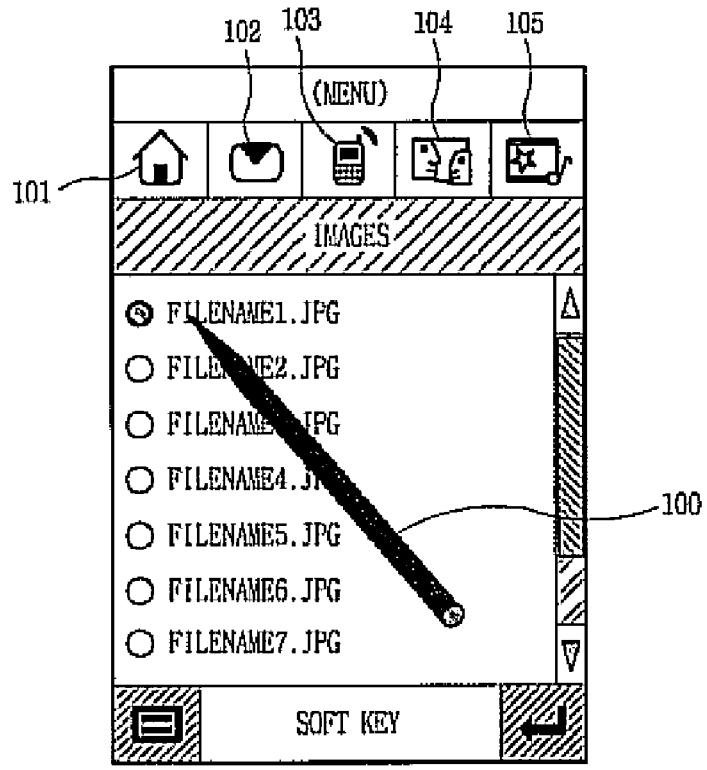
FIGS. 3A to 3D shows the sequential image data processing through the data processing apparatus of the mobile terminal according to the exemplary embodiment of the present invention.

With reference to FIG. 3A, the controller 12 checks whether the user selects an image list among a plurality of lists stored in the storage unit 11 by using a pointer such as a stylus 100 or the user's finger (step S11).

When an image list is selected by the user, the controller 12 outputs image data (e.g., Filename1.jpg, Filename2.jpg, . . . , FilenameN.jpg) included in the selected image list and a menu that contains a first menu icon 101 linked to a software program (e.g., a program for setting image data as a background photo) for processing image data on the display unit 14. In this case, because the user may select from multiple menu icons that may respectively be associated with the same or different software programs (applications), the controller 12 may display one or more menu icons linked to the plurality of applications on at least a portion of the screen (e.g., at an upper edge on the screen) when processing image data included in the image list through the display unit 14 (step S12). Herein, when particular data (list item, text object, etc.) is selected by the user, the controller 12 may display only those menu icons linked to an application for processing the particular data on the screen of the display unit 14. If there is insufficient room on the portion of the screen (e.g., along the top, bottom or side edge), additional menu icons may be viewed and selected by the user via a scrolling option. Namely, the user may scroll through menu icons may appear on the screen in according to user manipulation.

Figure 3B:
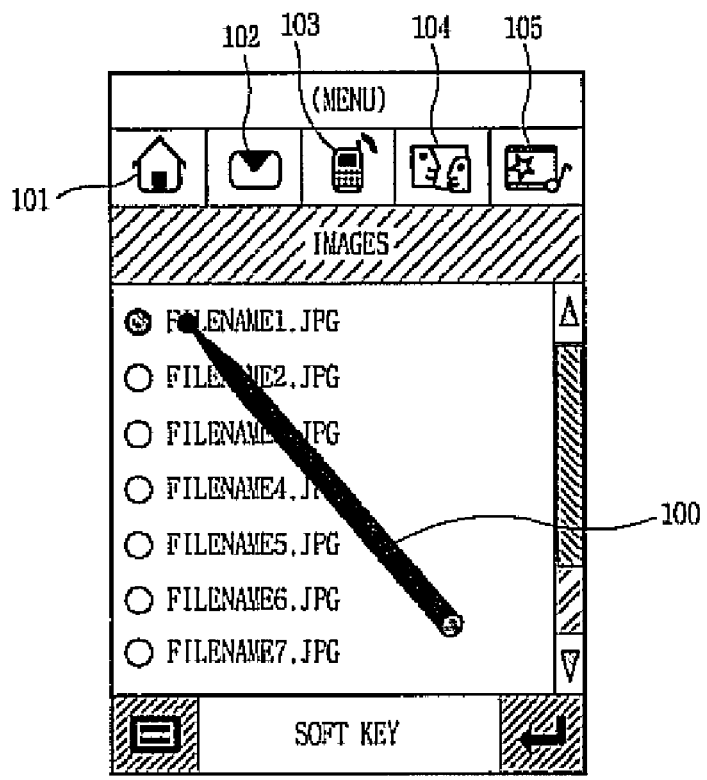
Figure 3C:
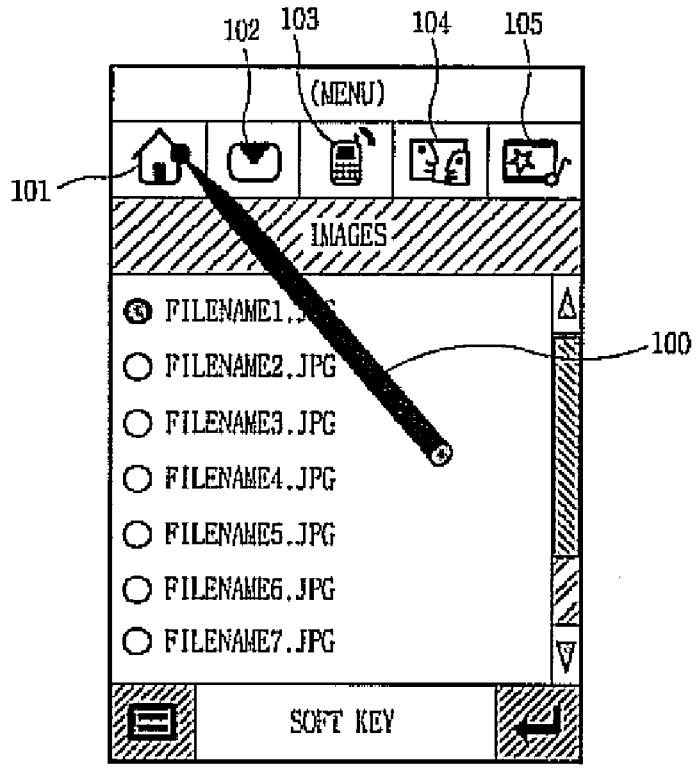

As shown in FIGS. 3B and 3C, the controller 12 checks whether the user selects particular image data (e.g., Filename1.jpg) among the image data through the touch screen of the mobile terminal, and drags it to the first menu icon 101 by using the stylus 100 (step S13). Namely, a drag-and-drop operation is performed, whereby the user selects a graphical object (e.g., a file name, text item, text object, etc.) with his finger or stylus and moves the selected object onto an icon (region or area) provided on an icon menu provided on the screen. When the particular image data is dragged and dropped to the first menu icon 101 by the user, the controller detects this and then executes a program linked to the first menu icon 101 (step S14) and then automatically processes the particular image data (step S15). For example, when the particular image data is dragged and dropped to the first menu icon 101 linked to the program for setting a background photo by the user, the controller 12 can execute the program linked to the first menu icon 101 (step S14) and then automatically set the particular image data (e.g., Filename1.jpg) as a background photo of the mobile terminal.

Herein, after the particular image data is selected by the user, when the first menu icon 101 is selected after the lapse of a pre-set time (e.g., 1-2 seconds), the controller 12 can execute the program linked to the first menu icon 101 and then process the particular image data (e.g., Filename1.jpg).

When the image data is processed, the controller 12 outputs a control signal informing that the image data has been completely processed to the notifying unit 13.

The notifying unit 13 outputs a notification message informing that the image data has been completely processed to the display unit 14 based on the control signal from the controller 12.

Figure 3D:
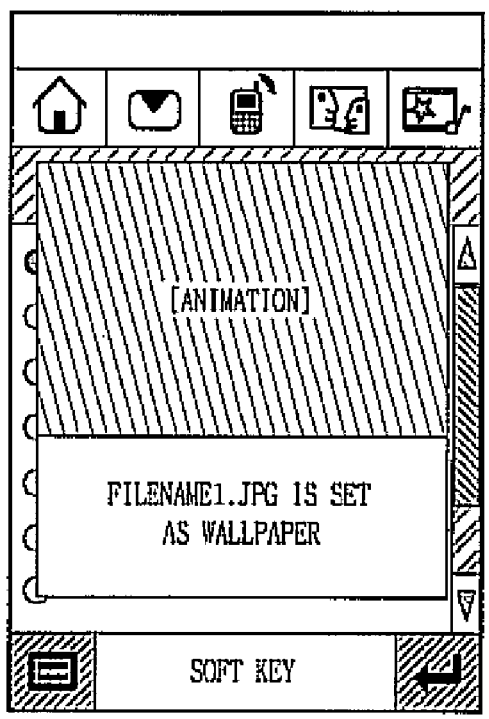

As shown in FIG. 3D, the display unit 14 displays the notification message through a pop-up window on the screen (step S16).

Here, it can be understood that the user may drag and drop a text item (list entry) onto an improper menu or menu icon. For example, the user may erroneously drag and drop an image data file that contains no audio data onto a sound reproduction icon to attempt activation. In such case, an error indication may be provided to the user informing that the operation or processing related to that menu or icon could not be executed for that text item. Alternatively, only certain types of icons related to appropriate processing that can possibly be performed on that particular text item may be displayed. So for example, if a list of image files that do not contain audio data is displayed, no sound reproduction icons would be shown to the user. This would prevent non-executable icon activation and further improves user convenience.

In this manner, the user can easily and quickly process image data by dragging and dropping the image data to the first menu icon 101 without having to separately perform the operation for executing a program for processing the image data.

Meanwhile, when a second menu icon linked to an image program for displaying image data is displayed on the display unit and the user drops the image data to the second menu icon, the controller 12 automatically displays the image data on the display unit 14. Accordingly, the user can drag and drop the image data to the menu or icon for displaying the image data, thereby easily and quickly look at image data without having to separately perform the operation for executing an image program.

When a third menu icon 102 linked to an e-mail program is displayed on the display unit 14 and the user drops the image data onto the third menu icon 102, the controller automatically executes the e-mail program and then automatically sets the image data as an attachment file. For example, when the third menu icon 102 liked to the e-mail program is displayed on the display unit 14 and the user drops the image data to the third menu icon 102, the controller 12 automatically executes the e-mail program and link an address of the image data to an attachment file item of the e-mail program. Accordingly, the user can drag the image data and drop it to the third menu icon 102 linked to the e-mail program, whereby the user can easily and quickly attach the image data to an e-mail without having to perform a separate operation for executing the e-mail program.

Figure 4:
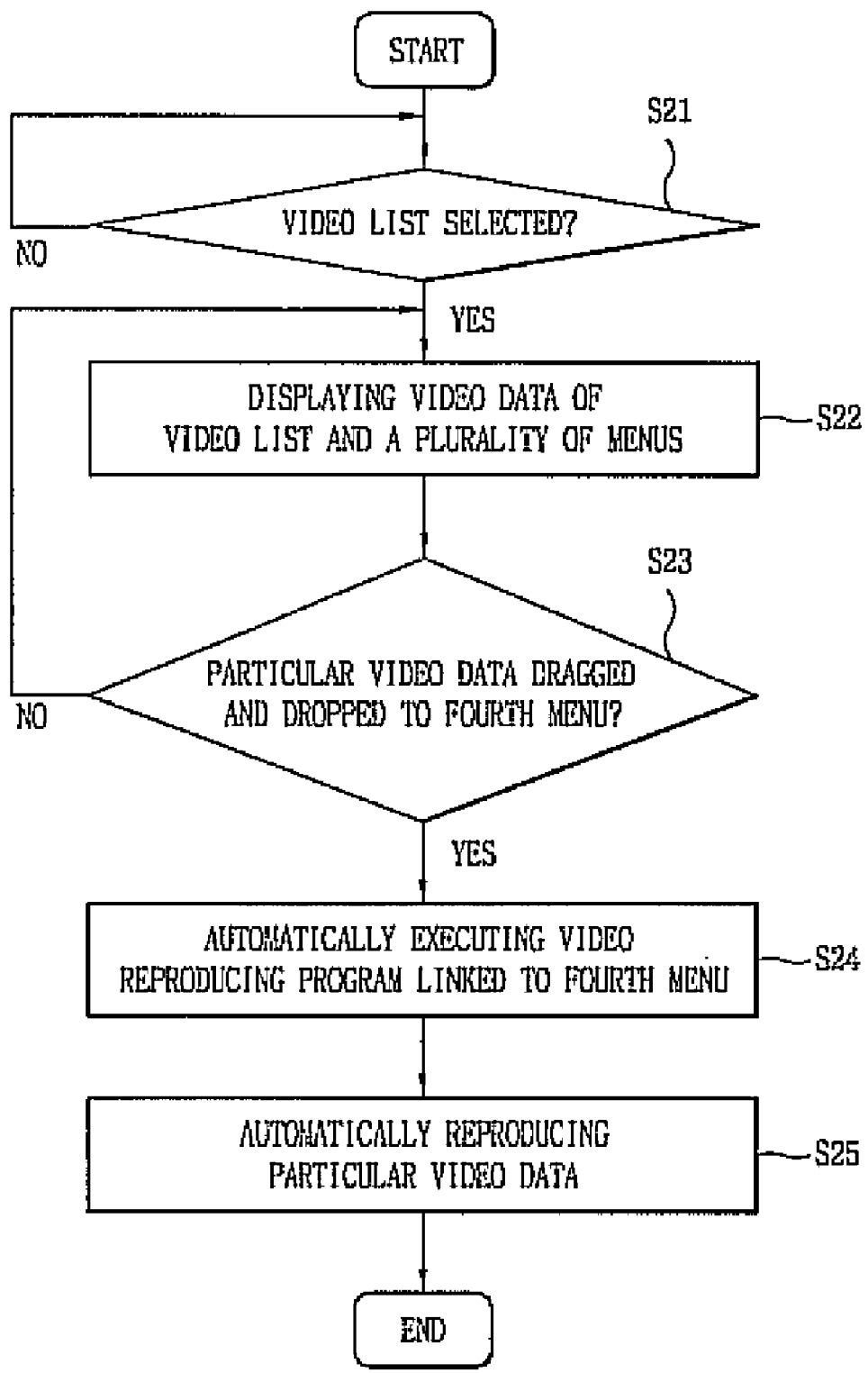
FIG. 4 is a flow chart illustrating the processes of a method for processing video data through the data processing apparatus of the mobile terminal according to the exemplary embodiment of the present invention.

FIG. 4 is a flow chart illustrating the processes of a method for processing video data through the data processing apparatus of the mobile terminal according to the exemplary embodiment of the present invention.

First, the controller 12 checks whether the video list is selected from the plurality of lists stored in the storage unit 11 by the user (step S21). When the video list is selected by the user, the controller 12 outputs video data (e.g., names of files in video format) included in the video list and a fourth menu icon 105 linked to a video reproducing program for reproducing the video data to the display unit 15. Then, the display unit 14 displays the video data included in the video list, the fourth menu icon 105 linked to the video reproducing program, and menus (icons) linked to the plurality of applications together on the screen (step S22).

Thereafter, the controller 102 checks whether the user selects particular video data among video data and drags and drops the selected particular video data onto the fourth menu icon 105 by using the stylus through the touch screen of the mobile terminal (step S23). When the user drags and drops the particular video data onto the fourth menu icon 105, the controller 102 automatically executes the video reproducing program linked to the fourth menu icon 105 (step S24) and the reproduces the video data (step S25). In this case, preferably, a message (informing that reproducing of video data completed) need not be displayed so that the user can quickly watch the video.

In this manner, by dragging and dropping the video data onto the menu linked to the video reproducing program, the user can easily and quickly watch the video without having to perform a separate operation for executing a program for reproducing video.

When a fifth menu icon linked to the music reproducing program for reproducing music data is displayed on the display unit 14 and the user drops the music data (e.g., music file name, song title, etc.) onto the fifth menu icon, the controller 12 automatically executes the music reproducing program to reproduce music data. Then, the user can drag the music data and drop it onto a menu icon linked to the music reproducing program, whereby the user can easily and quickly enjoy music data without having to perform the operation for executing a music data reproducing program.

Figure 5:
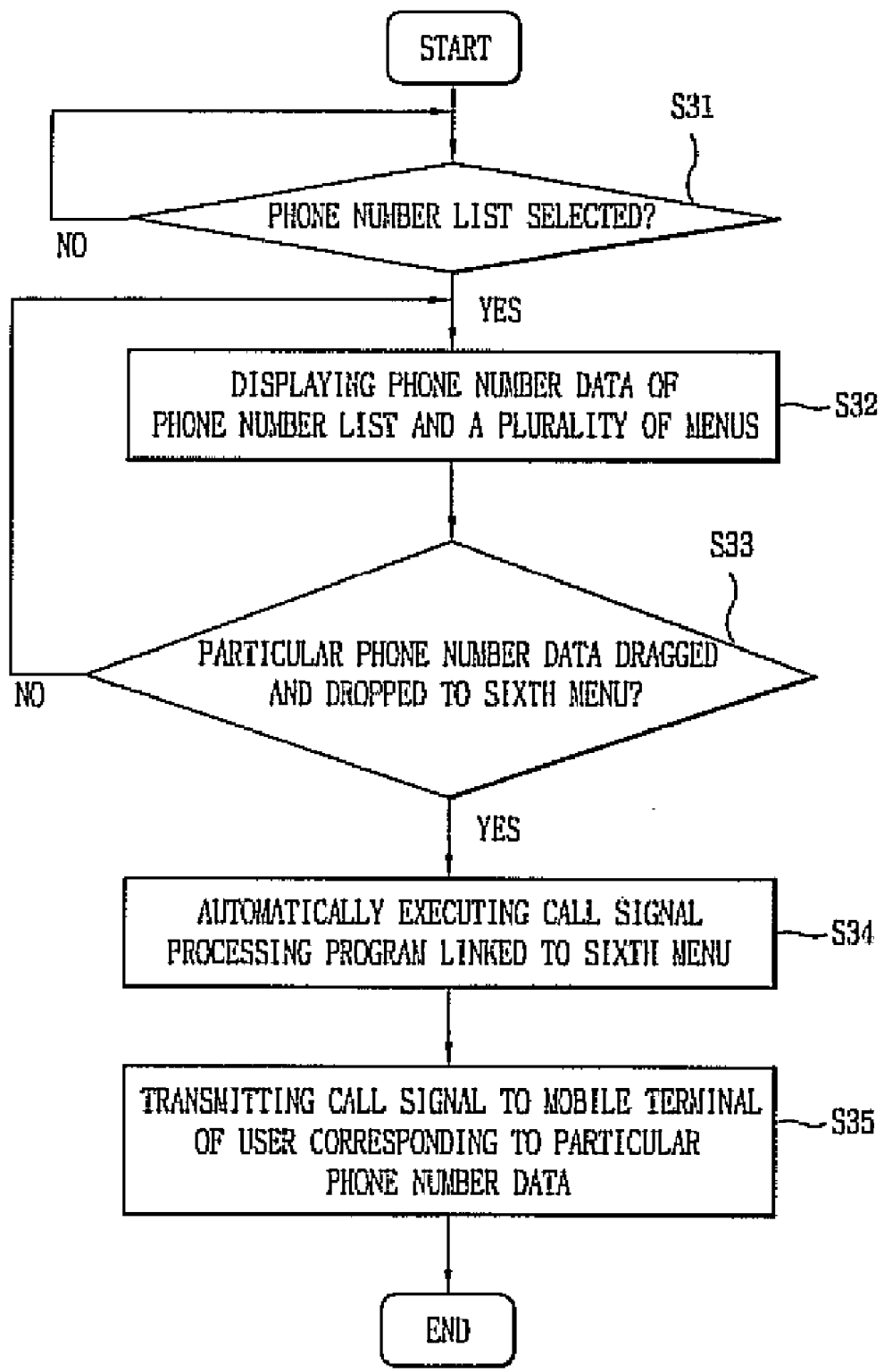
FIG. 5 is a flow chart illustrating the processes of a method for processing phone number data through the data processing apparatus of the mobile terminal according to the exemplary embodiment of the present invention.

FIG. 5 is a flow chart illustrating the processes of a method for processing phone number data through the data processing apparatus of the mobile terminal according to the exemplary embodiment of the present invention.

First, the controller 12 checks whether the phone number list among the plurality of lists stored in the storage unit 11 is selected by the user (step S31). When the phone number list is selected, the controller 12 outputs phone number data (i.e., phone number entries) included in the phone number list and the plurality of menu icons to the display unit 14. Then, the display unit 14 displays the phone number data included in the phone number list, a sixth menu icon 103 linked to a call signal processing program, and menus linked to the plurality of applications together on its screen (step S32).

Thereafter, the controller 12 checks whether the user selects a particular phone number among the phone number data, drags the selected phone number and drops it to the sixth menu icon 103 through the touch screen of the mobile terminal (step S33).

When the user drags and drops the particular phone number data to the sixth menu icon 103, the controller 12 automatically executes the call signal processing program linked to the sixth menu icon 106 (step S34) and transmits a corresponding call signal to a mobile terminal of a user corresponding to the particular phone number through an antenna of the mobile terminal (step S35).

In this manner, by dragging the particular phone number and dropping it to the menu icon 103 linked to the call signal processing program, the user can easily and quickly make a call without having to perform the operation for selecting a phone number one by one and a call button.

When a seventh menu icon 104 linked to a registration program for registering phone number data is displayed on the display unit 14 and the user inputs phone number data, drags the inputted phone number data and drops it to the seventh menu icon 104, the controller 12 automatically stores the phone number data in a phone book list. Accordingly, by dragging the phone number data and dropping it to the menu icon 104 linked to the phone number registration program, the user can easily and quickly register a phone number without having to perform the operation for executing a program for registering the phone number.

As so far described, the apparatus and method for processing data of a mobile terminal according to the present invention have many advantages.

That is, for example, when the user selects a particular list, data included in the particular list and menus (icons) linked to a plurality of applications are outputted, and when particular data among the data is dragged and dropped to a particular menu through the touch screen, an application linked to the particular menu is executed, whereby the user can easily and quickly process the particular data.

For example, when the user selects an image list, image data included in the image list and menus linked to the plurality of applications may be simultaneously outputted, and then, when particular image data, among the image data, is dragged and dropped to a background photo setting menu through the touch screen, a program linked to the background photo setting menu is executed, whereby the user can easily and quickly set the image data as a background photo.

In addition, when the user drags the image data and drops it to a menu for displaying the image data, the image data can be automatically displayed, whereby the user can easily and quickly look at the image data without the necessity of performing an operation for executing an image program.

Moreover, when the user drags the image data and drops it to a menu linked to the e-mail program, the image data can be automatically attached to an e-mail, whereby the user can easily and quickly attach the image data to the e-mail without the necessity of performing a separate operation for executing an e-mail program.

Furthermore, when the user drags video data and drops it to a menu for reproducing video, a video reproducing program can be automatically executed, whereby the user can easily and quickly watch video without the necessity of performing an operation for executing the video reproducing program.

Also, when the user drags the music data and drops it to a menu linked to the music reproducing program, the music reproducing program can be automatically executed, whereby the user can easily and quickly enjoy music data without the necessity of performing the operation for executing the music data reproducing program.

In addition, when the user drags a particular phone number and drops it to a menu linked to the call signal processing program, the call signal processing program can be automatically executed, whereby the user can easily and quickly make a call without the necessity of performing the operation for selecting a phone number one by one and selecting a call button.

In addition, when the user drags phone number data and drops it to the menu linked to the phone number registration program, the phone number can be automatically stored in the phone number list, whereby the user can easily and quickly register the phone number without the necessity of performing the operation for executing the program to register the phone number.

Furthermore, the present invention provides a graphical user interface displayed on a screen, the interface comprising: a first region of the screen showing one or more text objects that can be selected by user touch input; and a second region of the screen showing one or more icons that are activated when a text object selected by the user is dragged and dropped thereon. The first region and the second region may be displayed together simultaneously on the same screen image before user selection of a text object, and the first region may be initially displayed, and upon user selection of a text object, the second region may appears on the screen in addition to the first region. Here, the second region may be displayed along an edge of the screen. Also, the type of icons appearing in the second region depend upon the type of processing that may be performed on the one or more text objects, and each icon may be associated with a function (i.e. voice, data communications, data processing, image processing, etc) to process the dragged and dropped text object such that a visual, audible and/or tactile output is provided. In some case, the text object may be selected when the user touch input is applied on the displayed text object until a threshold time is reached, and the selected text object can then be dragged across the screen when the user touch input is moved while maintaining continued contact with the screen after the text object is selected, and an indication associated with a text object is provided when the text object is selected and/or is dragged by the user. When a text objection is selected, a pointer may be displayed on the screen at a spot where a user touch input is detected and the pointer may be displayed on the screen to follow a movement of the user touch input during a drag and drop operation.

In addition, the present invention provides a user interface of an electronic device, the interface comprising: a touch sensitive screen; a detector to detect user touch inputs on the screen; and a processor connected to and cooperating with the screen and the detector to allow a user to select a text item displayed on a first portion of the screen and then to drag and drop the selected text item onto an active region displayed on a second portion of the screen such that the text item is processed according to a function associated with that active region, wherein the active region comprises: one or more icons or graphical buttons that respectively represent a function executed by the processor that processed the text item to provide a visual, audible and/or tactile output. Here, the text item may indicate a text entry or digital image or video file that is stored in memory, and the text item may be selected when the detector detects that a user touch input is maintained on the displayed text item for a certain amount of time, and the selected text item can then be dragged according to a movement of the user touch input that is detected by the detector to stay in continued contact with the screen after the text item is selected.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A data processing apparatus of a mobile terminal, the apparatus comprising:
    a storage unit for storing data and at least one application for processing the data;
    a touch screen display unit for displaying the data on a first screen region of the touch screen display unit and two or more menu icons on a second screen region of the touch screen display unit, each of the two or more menu icons being linked to a corresponding one of the at least one application and the touch screen display unit receiving a drag-and-drop input;
    a controller operatively coupled with the storage unit and the display unit and configured to process a selected one of the stored data by executing an application linked to a selected menu icon of the two or more menu icons, wherein the controller is further configured to:
        cause displaying of a plurality of image lists on the touch screen display unit, at least one of the plurality of image lists comprising two or more of the stored data,
        receive a selection of the at least one of the plurality of image lists,
        cause displaying of the two or more stored data included in the selected at least one of the plurality of image lists on the first screen region,
        cause displaying of a plurality of menu icons of the two or more menu icons on the second screen region,
        receive a selection of one of the two or more stored data,
        stop displaying of menu icons among the plurality of menu icons that are not linked to applications that can process the selected one of the two or more stored data in response to the selection of the one of the two or more stored data,
        cause displaying of only menu icons among the plurality of menu icons that are linked to the applications that can process the selected one of the two or more stored data such that a number of menu icons decreases in response to the selection of the one of the two or more stored data when not all of the plurality of menu icons are linked to the applications that can process the selected one of the two or more stored data,
        receive the drag-and-drop input comprising dragging the selected one of the two or more stored data from the first screen region and dropping the dragged one of the two or more stored data onto a selected one of the plurality of menu icons displayed on the second screen region, the second screen region displaying only the menu icons that are linked to the applications that can process the dragged one of the two or more stored data, and
        process the selected one of the two or more stored data by executing the application linked to the selected one of the plurality of menu icons in response to the drag-and-drop input; and
    a notification unit operably coupled with the controller and generating a notification message for notifying completion of the processing, the notification message being displayed on the touch screen display unit upon completing the processing of the selected one of the two or more stored data.

2. The apparatus of claim 1, wherein the selected one of the two or more stored data is image data and the application linked to the selected one of the plurality of menu icons reproduces image data.

3. The apparatus of claim 1, wherein the selected one of the two or more stored data is image data and the application linked to the selected one of the plurality of menu icons sets image data as wallpaper.

4. The apparatus of claim 1, wherein the selected one of the two or more stored data is image data and the application linked to the selected one of the plurality of menu icons is an email application.

5. The apparatus of claim 4, wherein the image data is automatically attached to an e-mail as an attachment file.

6. The apparatus of claim 1, wherein the selected one of the two or more stored data is video data, and the application linked to the selected one of the plurality of menu icons reproduces video data.

7. The apparatus of claim 1, wherein the selected one of the two or more stored data is music data and the application linked to the selected one of the plurality of menu icons reproduces music data.

8. The apparatus of claim 1, wherein the selected one of the two or more stored data is a phone number and the application linked to the selected one of the plurality of menu icons processes call functions.

9. The apparatus of claim 1, wherein the selected one of the two or more stored data is a phone number and the application linked to the selected one of the plurality of menu icons processes the phone number into a list of contacts.

10. A method for processing data of a mobile terminal, the method comprising:
    displaying a plurality of image lists on a touch screen display unit, the touch screen display unit receiving a drag-and-drop input;
    selecting one image list among the plurality of image lists;
    displaying a plurality of data included in the selected one image list on a first screen region of the touch screen display unit and a plurality of menu icons on a second screen region of the touch screen display unit, each of the plurality of menu icons being linked to a corresponding application, upon selection of the one image list;
    receiving selection of one of the plurality of data;
    stopping displaying of menu icons among the plurality of menu icons that are not linked to applications that can process the selected one of the plurality of data in response to the selection of the one of the plurality of data;
    displaying only menu icons among the plurality of menu icons that are linked to the applications that can process the selected one of the plurality of data such that a number of menu icons decreases in response to the selection of the one of the plurality of data when not all of the plurality of menu icons are linked to the applications that can process the selected one of the plurality of data;

selecting a menu icon of the displayed plurality of menu icons in response to the drag-and-drop input comprising dragging the selected one of the plurality of data from the first screen region and dropping the dragged one of the plurality of data onto the selected menu icon displayed on the second screen region, the second screen region displaying only the menu icons that are linked to the applications that can process the dragged one of the plurality of data;

processing the selected one of the plurality of data by executing an application linked to the selected menu icon; and notifying completion of the processing by generating and displaying a notification message on the touch screen display unit upon completing the processing of the selected one of the plurality of data.

11. The method of claim 10, wherein the selected one of the plurality of data is image data and the application linked to the selected menu icon is an application to display image data.

12. The method of claim 10, wherein the selected one of the plurality of data is image data and the application linked to the selected menu icon is an application to attach image data to an email message.

13. The method of claim 10, wherein the selected one of the plurality of data is video data and the application linked to the selected menu icon is an application to reproduce video data.

14. The method of claim 10, wherein the selected one of the plurality of data is music data and the application linked to the selected menu icon is an application to reproduce music data.

15. The method of claim 10, wherein the selected one of the plurality of data is a phone number and the application linked to the selected menu icon is an application to initiate a phone call to the phone number.

16. The method of claim 10, wherein the selected one of the plurality of data is a phone number and the application linked to the selected menu icon is an application to register the phone number.

17. The method of claim 10, wherein the selected one of the plurality of data is a data file and the application linked to the selected menu icon is an application to process the data file.

* * * * *